(12) United States Patent
Flecknoe-Brown et al.

(10) Patent No.: US 7,722,908 B2
(45) Date of Patent: May 25, 2010

(54) METHOD OF MATURING WINE

(75) Inventors: Anthony Earl Flecknoe-Brown, Yarra Glen (AU); Michael James Unwin, Beaufort (AU)

(73) Assignee: Flextank International Ltd., Yarra Glen, Victoria (AU)

( * ) Notice: Subject to any disclaimer, the term of this patent is extended or adjusted under 35 U.S.C. 154(b) by 255 days.

(21) Appl. No.: 10/580,524

(22) PCT Filed: Nov. 25, 2004

(86) PCT No.: PCT/AU2004/001632
§ 371 (c)(1),
(2), (4) Date: May 24, 2006

(87) PCT Pub. No.: WO2005/052114
PCT Pub. Date: Jun. 9, 2005

(65) Prior Publication Data
US 2007/0128387 A1    Jun. 7, 2007

(30) Foreign Application Priority Data
Nov. 28, 2003   (AU)   ............................... 2003906581

(51) Int. Cl.
*B32B 27/08* (2006.01)
(52) U.S. Cl. ........................ 426/422; 426/392; 426/394; 426/395; 426/474; 426/592; 426/15
(58) Field of Classification Search ................. 426/422, 426/392, 394, 395, 474, 592, 15
See application file for complete search history.

(56) References Cited
U.S. PATENT DOCUMENTS 3,256,977 A    6/1966  Gunnar
3,965,953 A    6/1976  Becker et al.
4,907,719 A    3/1990  Spotholz
2003/0194302 A1 *  10/2003  Hickinbotham ............. 414/432

(Continued)

FOREIGN PATENT DOCUMENTS

AU        71589/74         1/1976

(Continued)

OTHER PUBLICATIONS

Mechanical English Translation of DE 2357970 published Jun. 1974.*

(Continued)

*Primary Examiner*—Anthony Weier
(74) *Attorney, Agent, or Firm*—Volpe and Koenig, P.C.

(57) ABSTRACT

A container assembly for controlling rate of oxygen transfer from the atmosphere into a liquid stored in the container assembly having, a container with an oxygen permeability of 50 ml to 300 ml of oxygen per square meter of area of walls of the container for each millimeter of the thickness of the walls per 24 hour period at room temperature, a barrier member for providing a barrier to limit oxygen access from head space in the container to a surface of the liquid the barrier member having a construction which causes it to float on the liquid surface, and a peripheral flange surrounding the barrier member arranged so that it makes a slidable peripheral seal with the walls of the container.

6 Claims, 2 Drawing Sheets

U.S. PATENT DOCUMENTS

2003/0218016 A1   11/2003   Iskierka
2004/0131806 A1*   7/2004   Barmore et al. ............ 428/34.2
2004/0226451 A1*   11/2004   Diaz ........................... 99/276

FOREIGN PATENT DOCUMENTS

| | | | |
|---|---|---|---|
| DE | 2357970 | * | 6/1974 |
| DE | 2320296 | | 11/1974 |
| FR | 1542901 | | 10/1968 |
| FR | 2445278 | | 7/1980 |
| FR | 2499522 | | 8/1982 |
| FR | 2522677 | | 9/1983 |
| FR | 2736923 | * | 7/1995 |
| GB | 1347567 | | 2/1974 |
| JP | 46041597 | | 7/1968 |
| WO | WO 01/28889 | | 4/2001 |
| WO | WO 03/022983 | | 3/2003 |
| WO | WO 03/029091 | | 4/2003 |

OTHER PUBLICATIONS

Gaseous Exchange in Wine Stored in Barrels, Moutounet, Mazauric et al., J. Sci. Tech. Tonnellerie, 1998.
European Search Report, dated Sep. 4, 2009, Appln. No. 04797080.1-2114.

* cited by examiner

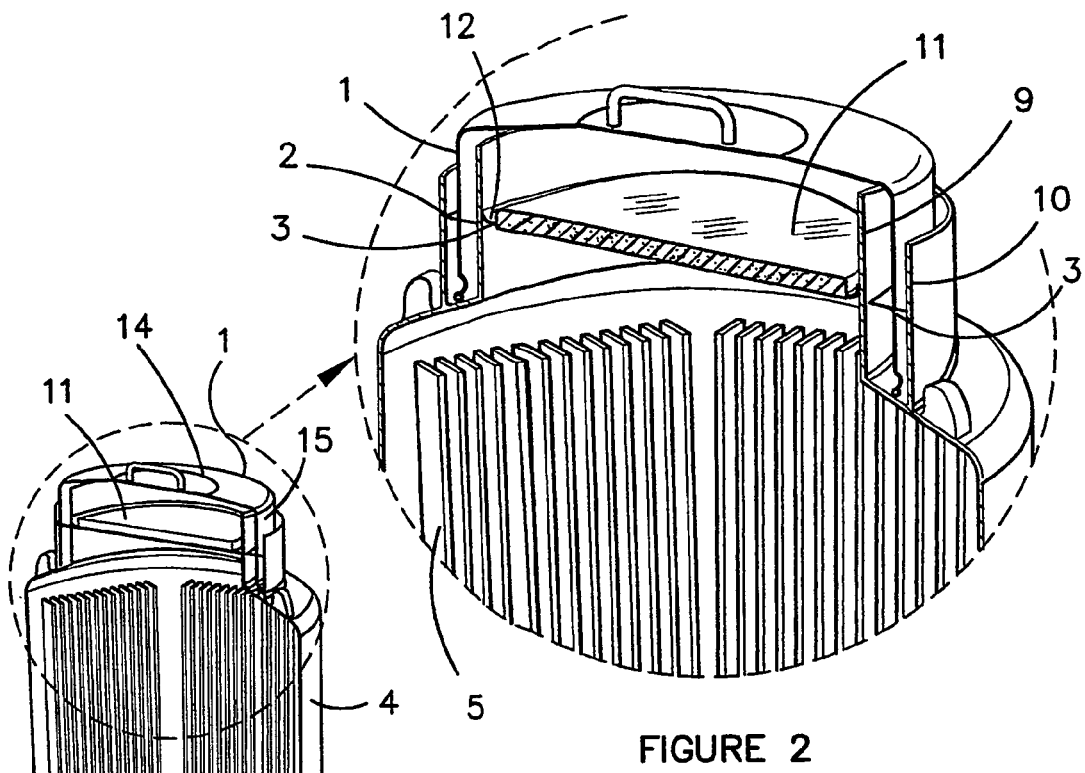
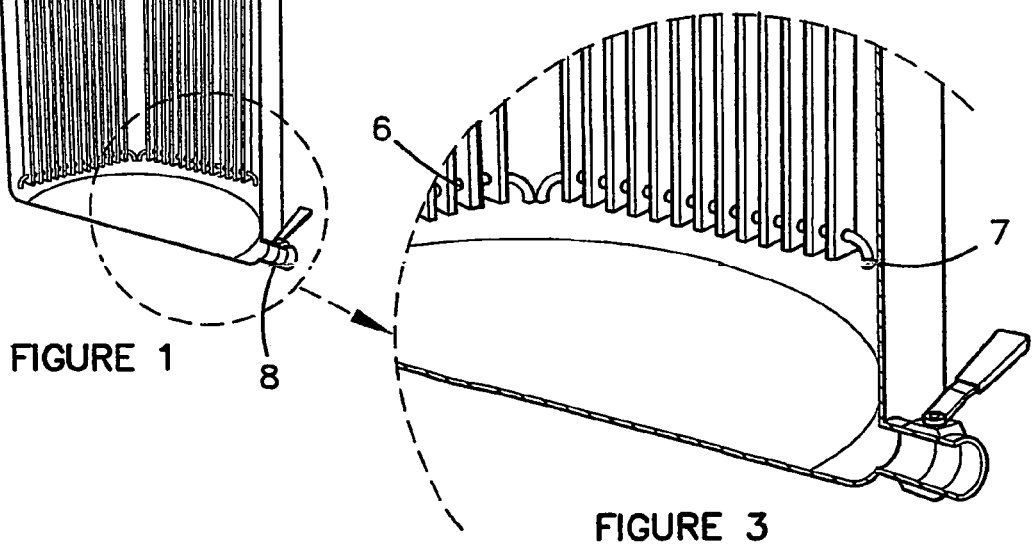
FIGURE 1
FIGURE 2
FIGURE 3

METHOD OF MATURING WINE

FIELD OF THE INVENTION

This invention relates to the control of oxygenation of stored liquids. It relates particularly but not exclusively to methods and apparatus for the control of oxygenation of wine.

BACKGROUND OF THE INVENTION

Many red and some white wine varieties are matured in oak barrels, according to the wine variety, quality and desired character.

The general aim of wine aging in Oak barrels, is to develop a desired aged wine bouquet and character, by:
  Controlled and slow oxidation of various wine substances especially the phenolic compounds. This slow oxidation, followed by polymerization, results from limited and gradual exposure to air oxygen diffusing through the walls of the barrel over months.
  Extraction of Oak flavour components, including Oak phenolics to enhance and expand the wine's complexity.

However Oak barrels are expensive to fashion, cumbersome to store and handle, often inconsistent in wood properties, subject to leakage and limited in useful life.

Oak barrels also require a voluminous storage facility with a controlled temperature and humdidity environment to minimize evaporative loss due to transpiration through their porous walls.

Accordingly there have been many attempts to replicate the effects of barrel aging on wine, without the actual use of oak barrels. For example:
  The addition of Oak sawdust, chips or staves into metal bulk storage tanks, to expose the wine to Oak characters. However this only achieves the Oak flavour extraction function of barrel aging, not the oxidative one. This can be mitigated to some extent by regularly "pumping over" the wine in the tank, in order to re-aerate it. However this often introduces too much dissolved oxygen all at once, allowing aerobic bacteria such as Acetobacter to become established and begin oxidizing the ethanol in the wine into acetaldehyde, ethyl acetate and ultimately acetic acid, with consequent loss of wine quality. These oxidation products are termed "volatile acidity" in the wine industry.
  The development of composite containers made of metal (stainless steel) and fitted with flat Oak panels or ends which can be more easily fashioned and which may be reversed to expose fresh Oak to the wine contents. Such containers usually don't have the optimum ratio of surface area of Oak to volume of wine contained and are usually inadequate both in the extractive and oxidative functions.

More recent developments include the use of "micro-oxygenation" wherein air or pure oxygen is introduced directly into bulk-tanked wine with added Oak chips or planks, by generating very fine bubbles through the wine by means of a micro-porous (ie. sintered) dispersion element on the end of a submerged gas line or lines.

This is a difficult process to adequately control and can possibly lead to excess levels of dissolved oxygen at the bubble interfaces, again promoting ethanol oxidation and other degradative side-effects through fast oxidation of wine. The equipment required to contain and feed fixed volumes of oxygen or to accurately meter a continuous flow over set time periods at very low flow rates, is normally expensive and difficult to operate. That cost also means the resource has to be shared over a number of tanks, which militates against long, slow maturation times in individual tanks.

Recent studies such as reported in "Gaseous Exchange in Wine Stored in Barrels", Moutounet, Mazauric et al, J. Sci. Tech. Tonnellerie, 1998 (herein incorporated by reference) have explained the mechanism by which barrels add oxygen to wine and promote "correct" maturation. The oak walls of wine barrels act as semi-permeable "membranes", allowing oxygen gas in the atmosphere outside the barrel to permeate through the barrel walls and diffuse into the wine. This osmotic exchange is driven by the partial pressure difference of the atmospheric oxygen outside the barrel (0.18 atm) and the effectively zero partial pressure of oxygen inside. This absence of oxygen in the barrel arises because wine continuously consumes all available oxygen in the slow-oxidation reactions that occur in the reductive environment that exists when the rate of oxygen addition occurs at very low rates over long periods, due to slow diffusion.

Furthermore, it has been shown that it is this slow permeation (diffusion) of atmospheric oxygen that contributes most to "barrel softening or maturation". Moutounet et. al. (referred to above) showed that a typical new oak barrique allows $O_2$ permeation through its walls, in the range of 20-30 mg/l.yr. Kelly and Wollan report an estimated "highest diffusion" (ie. permeation) rate" into a typical barrique as 2.2 ml $O_2$/liter wine/month or 26.4 ml/l/yr (34.6 mg/l./gr) in their paper "Micro-oxygenation of Wine in Barrels", Wine Network Technology, www.winenet.com.au, incorporating International Patent Application PCT/AU02/01250 (both herein incorporated by reference). As used hereinafter in the application and claims, the phrase "oak cask maturation" is defined as maturation that takes place in oak casks at the levels of oxygen permeation normally associated with maturation in oak casks.

Any free surface arising from head-space in a wine storage vessel is undesirable, if it contains oxygen. At that surface the levels of dissolved oxygen increase in concentration, to near saturated (9 ppm at 20 Celsius and 1 atm). In this oxygen rich surface layer aerobic bacteria will propagate, generating volatile acidity and acetaldehyde at a rate dependent usually on the surface area of the free surface and the oxygen content of the surface gas. The lesser the free surface area, the longer that wine can be safely kept in bulk storage.

DISCLOSURE OF THE INVENTION

The invention provides in one aspect a method of controlling rate of oxygen transfer from the atmosphere into a liquid comprising,
  storing the liquid in a closed container having walls exposed to the atmosphere at atmospheric pressure,
  wherein the container is self supporting and the walls of the container comprise a rigid plastics material which allows oxygen (typically at atmospheric partial pressure of 0.18 atm) to permeate the walls directly from the atmosphere into the liquid in contact with the walls at a rate of 13 mg to 65 mg of oxygen per square meter of the wall area for each 1 millimeter of the walls thickness per 24 hour period at room temperature.

Suitably, the liquid comprises wine.

In order to limit the transfer of oxygen into the surface of the wine, a barrier member may be floated on the surface. Suitably, the barrier member has a peripheral portion which is in sliding contact with the container walls to separate the liquid surface from the head space in the container.

Typically, the wine may be stored in the container for a period ranging between 4 months and 36 months with the total rate of oxygen transmission into the wine being maintained at less than 55 mg/liter of wine/year.

Oak staves may optionally be suspended in the wine during the storage period.

In another aspect, the invention provides a container assembly for controlling rate of oxygen transfer from the atmosphere into a liquid stored in the container assembly comprising, a container with an oxygen permeability of 13 mg to 65 mg of atmospheric oxygen per square meter of area of walls of the container for each millimeter of the thickness of the walls per 24 hour period at room temperature, and a barrier member for providing a barrier to limit oxygen access from head space in the container to a surface of the liquid the barrier member having a construction which causes it to float on the liquid surface.

A peripheral flange may surround the barrier member so that it makes slidable contact with the walls of the container.

In another aspect the invention provides a barrier member as described herein.

The method and apparatus of the invention can achieve the simultaneous extractive and slow-oxidative effects of Oak barrel aging without the need to use such barrels or to add extra oxygen gas or air into the wine.

Furthermore the method of our invention allows the independent adjustment of both the degree of Oak extraction and the degree of slow-oxidation. In this way it is possible to replicate the different extractive and oxidative effects of Oak casks of different ages (the oxygen permeability of a barrel decreases by about 20% for each year it is used) and of different surface area to volume ratios. Common Oak cask sizes are Barriques (225 liters), Hogsheads (300 liters) and Puncheons (500 liters).

Preferred aspects of the invention will now be described with reference with to the accompanying drawings.

BRIEF DEXCRIPTION OF THE DRAWINGS

FIG. 1 shows a cut away isometric view of a wine container constructed in accordance with the invention;

FIG. 2 shows an enlarged view of the circled area at the top of FIG. 1;

FIG. 3 shows an enlarged view of the circled area shown at the bottom of FIG. 1;

DETAILED DESCRIPTION OF THE PREFERRED EMBODIMENTS

Figure 4:
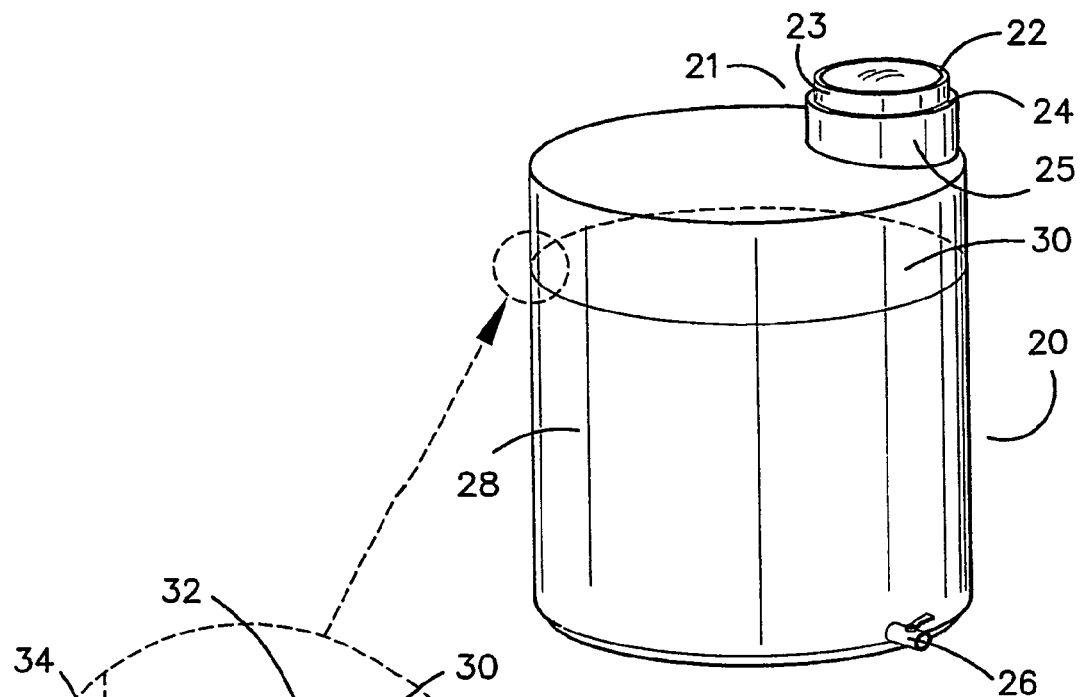
FIG. 4 shows an alternative tank construction.

The various elements identified by numerals in the drawings are listed in the following integer list.

Integer List
1 Cover
2 Water trap
3 Level
4 Plastic tank
5 Staves
6 Hole
7 Rod
8 Base valve
9 Cylinder
10 Outer cylinder
11 Disc
12 Lip
14 Top panel
15 Skirt
20 Plastic tank
21 Neck
22 Closure
23 Skirt
24 Water trap
25 Circumferential wall
26 Tap
28 Wine
30 Barrier member
31 Foamed plastic core
32 Polyurethane film overwrap
34 Peripheral flange
35 Wall
36 Tag
37 Hole/loop Referring to FIGS. 1 to 3, there is shown an optionally thermally insulated plastic tank with an opening in the top defined by neck formed as a cylinder 9 forming part of the tank, to which any closure can be fitted.

In this embodiment an optional circumferential wall in the form of an outer cylinder 10 is welded to or molded as part of the tank 4 and an optional base valve 8 is fitted through the side wall, above the base of the tank so as to enable bottom filling or discharge of the tank contents without disturbing sediment that may have settled to the bottom of the tank.

The tank 4 is sealed by means of a closure comprising an inverted dome-shaped cover 1 having a top panel 14 and depending skirt 15. The skirt is partially submerged in a water trap 2 formed by adding water to the space between the two concentric cylinders 9 and 10. Whilst the specific embodiment shown uses a water trap it is to be appreciated that a simple closure such as a wide mouth screw cap can be used. It is preferable that the closure and container neck be wide enough to allow a person to have hand access to all internal surfaces for cleaning.

The tank 4 and top cylinders 9 and 10 are made from polyethylene with an oxygen permeability in the range between 13 mg to 65 mg of atmospheric oxygen per sqm of tank surface per 24 hr for each 1 mm of tank wall thickness at typical storage temperatures of 20-25 degr C.

The ratio of contained volume to surface area of the container falls within the range 5 to 30 liters per square meter of surface for each 1 mm of thickness, to ensure that an adequate rate of permeation of oxygen is maintained.

Suspended within the wine-filled tank are an optional number of oak-wood staves 5 of the desired variety and degree of toast (ie. charring). At the lower end of each stave a hole 6 is drilled to enable that stave to be threaded onto or otherwise attached to a solid rod 7 usually made of stainless steel, which is sufficiently heavy to keep all of the wooden staves attached to it from floating to the surface. The total surface area of oak-wood presented to the wine will depend on the variety of wine, the degree to which the winemaker wants to impart oak character to it and the number of times the oak staves have already been used in wine.

In this embodiment, the stainless steel rod 7 is bent into a "U" shape, so that the ends hang downwards and the staves float upwards. By this simple means the staves are prevented from floating off the ends of the rod 7.

Alternatively, the oak planks may be pre-assembled into a pack, not requiring a hole or rod to fit them onto. The pack may be inserted preassembled through the mouth of the tank and removed for replacement, cleaning or sterilization as and when required.

The level of wine 3 in the tank will normally lie within the top cylindrical chamber formed by the cylinder 9. Resting or floating on the wine surface is a barrier member comprising a buoyant disc 11 made of wine-safe polymer such as polyethylene. It may comprise an upside down dish shape. Alternatively it may be a composite structure comprising a disc of plastic foam overwrapped and sealed within a wine-safe film of predetermined oxygen barrier properties. The outer perimeter of the buoyant disc may optionally be furnished with a flexible lip 12 which forms a "wiper seal" with the inner face of the chamber cylinder 9. The purpose of the buoyant disc is to lie in and block the free wine surface from access to the head space air or gas in the chamber 9. The disc minimizes the rate at which particular gases in the head space, such as oxygen, can dissolve into the wine via the free surface.

The buoyant disc acts as a barrier member which can also have tailored gas permeability suitably at the levels already described to enable controlled oxygen permeation into a tank made from impermeable material, such as Stainless Steel.

Thus, the barrier member and poly tanks can be used together or separately, to passively "meter" the addition of atmospheric oxygen into wine, without allowing conditions to develop where a significant free surface area of wine is directly exposed to the atmosphere.

The upper limit of mass transfer of oxygen into wine by permeation is typically about 80 mg/l/year. At rates higher than that wine is not capable of using up all the available oxygen in typical maturation reactions and a measurable concentration of dissolved oxygen results. In those conditions, aerobic bacteria such as acetobactor, and gluconobacter, which are always present in low populations in all wine that hasn't been sterile-filtered will propagate and damage the wine.

When used in the main body of a tank as is shown in FIG. 4 $CO_2$ can be added into the head space to protect the small area of exposed wine around the perimeter of the added barrier member. As gas dissolves into liquid at a rate directly proportional to the exposed surface area, re-charging the head space with $CO_2$ only needs to be done very infrequently when a barrier member is used, ie. once per month rather than every couple of days, due to the 50 to 100 fold typical reduction in exposed surface area. The exposed annulus is typically about 5 mm wide. If the tank body has a diameter of "D" in meters, the exposed surface without barrier=$\pi \times D^2/4$ and with a barrier it is $0.005 \times \pi \times D$. For a tank of 1 m diameter, the exposed surface with a barrier is proportionally $0.005 \times 4/D$ or just 2% of that without a barrier member.

The edge flap helps to centralize the disc, keep out contamination and contain $SO_2$ gas that is coming out of solution from the wine so that mould cannot grow there.

Figure 5:
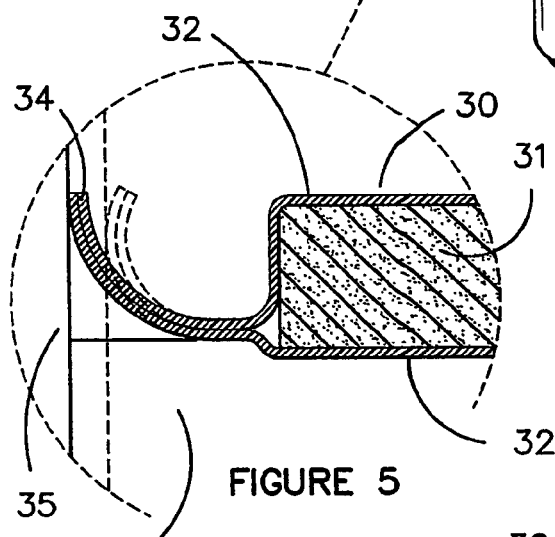
FIG. 5 shows an enlarged cross sectional view of part of the circled region of FIG. 4.
Figure 6:
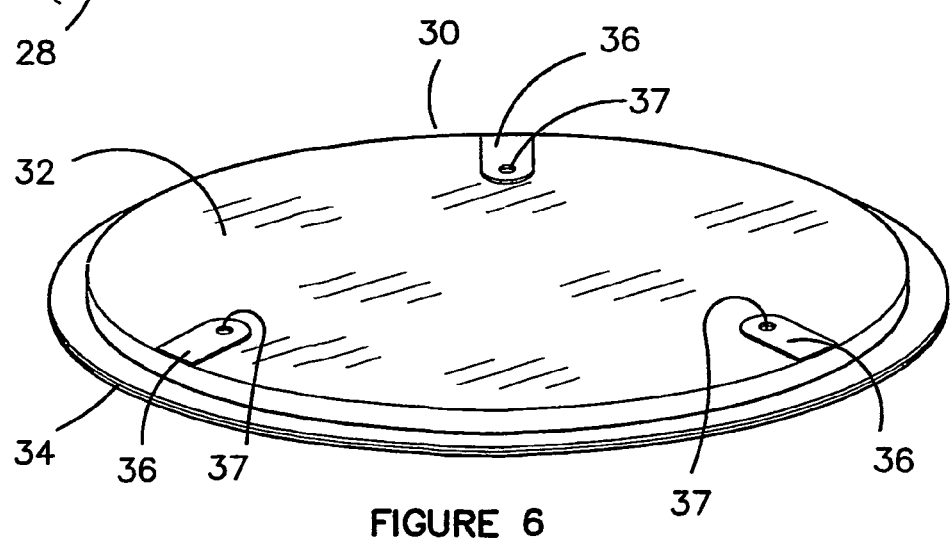
FIG. 6 shows an isometric view of a barrier member for use with the invention.

Referring to FIGS. 4 to 6, there is shown a plastic tank 20 for wine with a neck construction generally designated 21. Whilst the illustrated tank is plastic it is to be appreciated that the tank may be made of any suitable wine contact material such as stainless steel and uses any typical closure that seals the opening.

A closure 22 having a depending circumferential skirt 23 closes off the neck.

As in the case of the previously described container, a circumferential wall 25 surrounds the neck and provides a water trap 24 between the neck and circumferential wall and the skirt 23 of the closure fits into this water trap to seal off the neck.

A tap 26 is provided at the bottom of the container to drain off the wine 28 as and when needed.

A barrier member 30 having a foamed plastic core 31 floats on top of the wine in the body of the container. The foamed plastic core 31 of the barrier member is overwrapped with a polyurethane film overwrap 32 which comprises two separate layers covering the top and bottom of the foamed plastic core. These two separate layers are laminated together at their edges to form the peripheral flange 34. The peripheral flange provides a slidable seal with the wall 35 of the container so as to substantially reduce the rate of oxygen transfer from the head space of the container through the surface of the wine and hence limits the growth of undesirable aerobic bacteria.

The barrier member is provided with three tags 36 distributed around its upper surface, each of the tags being formed with a hole or loop 37. The tags assist with allowing the barrier member to be correctly located in the container in contact with the wine initially and to be removed after the container has been emptied. In this regard, it is noted that the barrier member comprising the foamed plastic core and polyurethane film overlap may suitably be formed of flexible materials in order to allow it to be folded so that it may be inserted through the neck of the container during initial setup and to be removed through the neck when the container is emptied.

Whilst the above description includes the preferred embodiments of the invention, it is to be understood that many variations, alterations, modifications and/or additions may be introduced into the constructions and arrangements of parts previously described without departing from the essential features or the spirit or ambit of the invention.

It will be also understood that where the word "comprise", and variations such as "comprises" and "comprising", are used in this specification, unless the context requires otherwise such use is intended to imply the inclusion of a stated feature or features but is not to be taken as excluding the presence of other feature or features.

The reference to any prior art in this specification is not, and should not be taken as, an acknowledgment or any form of suggestion that such prior art forms part of the common general knowledge in Australia.

The invention claimed is:

1. A method of maturing wine in bulk after fermentation comprising,
    storing the wine in a closed container over a period ranging from four to thirty-six months after fermentation of the wine,
    wherein the container has walls that comprise polyethylene and are sufficiently stiff so as to render the container self supporting, and
    the walls comprise a combination of thickness, surface area, and volume to permit oxygen to permeate the walls directly from the atmosphere into the wine in contact with the walls at a rate less than 80 milligrams of oxygen per liter of wine per year and the combination of thickness, surface area, and volume provides the container with an oxygen permeation rate that results in wine maturation equivalent to oak cask maturation.

2. The method according to claim 1 wherein the wine has a wine surface and the level of the wine surface in the container creates a head space in the container and the wine surface is separated from the head space by a barrier member floating on the wine surface, the barrier member having a peripheral portion which is in sliding contact with the container walls so as to separate the wine surface from the head space.

3. The method according to claim 2 wherein permeation rate is less than 55 mg/liter of wine/year.

4. The method according to claim 1 wherein oak staves are suspended in the wine during the storage period.

5. The method according to claim 1 wherein the permeation rate is less than 55 milligram of oxygen per liter of wine per year.

6. A method of maturing a beverage other than table wine in bulk after fermentation of the beverage, comprising:

storing the beverage in a closed container having walls over a period ranging from 4 to 36 months after fermentation of the beverage, with the walls being sufficiently stiff so as to render the container self supporting, wherein the walls are exposed to the atmosphere so as to allow atmospheric oxygen to permeate through the walls, and the walls comprise polyethylene and a combination of area and thickness that permits controlled maturation of the beverage by controlling oxygen permeation through the walls to a rate of less than 80 milligrams of oxygen per liter of wine throughout the period and the combination of area and thickness provides the container with an oxygen permeation rate that results in maturation equivalent to oak cask maturation.

* * * * *